US006614635B2

(12) United States Patent
Behrens

(10) Patent No.: US 6,614,635 B2
(45) Date of Patent: Sep. 2, 2003

(54) CIRCUIT PROVIDED WITH A PROTECTIVE FUNCTION

(75) Inventor: Juergen Behrens, St. Augustin (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/969,960

(22) Filed: Oct. 2, 2001

(65) Prior Publication Data

US 2002/0011888 A1 Jan. 31, 2002

Related U.S. Application Data

(63) Continuation of application No. PCT/EP00/02735, filed on Mar. 29, 2000.

(30) Foreign Application Priority Data

Apr. 3, 1999 (DE) ........................................ 199 15 234

(51) Int. Cl.[7] ................................................ H02H 3/00
(52) U.S. Cl. ........................... 361/63; 307/86; 307/125
(58) Field of Search ............................. 361/30, 31, 52, 361/53, 62, 63–69, 78, 79, 86, 87, 160, 166, 167, 170, 187, 191; 307/85, 86, 116, 125, 130, 131, 132 E, 132 EA; 324/422

(56) References Cited

U.S. PATENT DOCUMENTS 6,108,179 A * 8/2000 Katae et al. .................. 361/31
6,359,440 B2 * 3/2002 Pohl et al. .................. 324/423

FOREIGN PATENT DOCUMENTS

| | | | |
|---|---|---|---|
| DE | 3937122 | 5/1991 | .......... H01H/47/00 |
| EP | 0241270 | 10/1987 | ........... G01R/31/02 |

* cited by examiner

*Primary Examiner*—Ronald W. Leja
(74) *Attorney, Agent, or Firm*—Davidson, Davidson & Kappel, LLC

(57) ABSTRACT

A protective circuit arrangement includes at least two power contactors that have main make contact elements arranged in enable circuits. Each main make contact element of a power contactor is connected in series to a main make contact element of another power contactor in each respective enable current circuit. A respective coil circuit make contact element is provided in the coil current circuit of each coil of each power contactor, whereby the coil circuit make contact elements can be jointly actuated. The main make contact elements of each power contactor are disposed between two respective auxiliary contact units which each have a respective make contact element and a respective break contact element, and which are respectively configured as positively driven contacts. The make contact elements of all auxiliary contact units arc connected in series in a first indicator circuit, and the break contact elements of all auxiliary contact units are connected in series in a second indicator circuit. The main make contact elements and the contacts of the assigned auxiliary contact units are fixed on a common contact bridge.

1 Claim, 4 Drawing Sheets

CIRCUIT PROVIDED WITH A PROTECTIVE FUNCTION

This is a continuation of International Application No. PCT/EP00/02735, filed Mar. 29, 2000, the entire disclosure of which is hereby incorporated by reference herein.

BACKGROUND

The present invention relates to a circuit arrangement having a protective function, containing at least two power contactors which have main make contact elements arranged in enable circuits, in each case one main make contact element of a power contactor being connected in series to a main make contact element of another power contactor in the respective enable circuit.

In circuit arrangements having protective functions, goals include, on one hand, to recognize individual faults by carrying out the protective function but, on the other hand, to prevent unexpected starting as well. Protection against unauthorized, unintentional or erroneous closing of dangerous electric circuits should also be ensured. A circuit arrangement having a protective function which, however, contains positively driven relays, is described in German Patent Document No. DE 39 37122 C2. There, a so-called "fail-safe circuit" is implemented by a fail-safe AND gate which connects through to the coils of the positively driven relays only if the required safe condition exists, that is if none of the components is defective. In the case of power contactors, a positive drive of main and auxiliary contacts is not possible for design reasons.

SUMMARY OF THE INVENTION

Therefore, an object of the present invention is to provide a circuit arrangement having a protective function which fulfills the above-mentioned criteria and which is suitable, in particular, for power contactors.

The present invention provides a protective circuit arrangement. The protective circuit arrangement includes: a first power contactor, the first power contactor including a first coil and a first main make contact element; a second power contactor, the second power contactor including a second coil and a second main make contact element, the second main make contact element being connected in series with the first main make contact element in an enable circuit; a first coil circuit make contact element connected in a first coil circuit of the first coil; a second coil circuit make contact element connected in a second coil circuit of the second coil, the first and second coil circuit make contact elements being capable of being jointly actuated; a first auxiliary contact unit including a first make contact element and a first break contact element, the first make and break contact elements being positively driven; a second auxiliary contact unit including a second make contact element and a second break contact element, the second make and break contact elements being positively driven; a third auxiliary contact unit including a third make contact element and a third break contact element, the third make and break contact elements being positively driven; and a fourth auxiliary contact unit including a fourth make contact element and a fourth break contact element, the fourth make and break contact elements being positively driven. The first, second, third and fourth make contact elements are connected in series in a first indicator circuit; the first, second, third and fourth break contact elements are connected in series in a second indicator circuit; the first main make contact element is disposed between the first and third auxiliary contact units; the second main make contact element is disposed between the second and fourth auxiliary contact units; the first main make contact element and the first and third make and break contact elements are disposed on a common first contact bridge; and the second main make contact element and the second and fourth make and break contact elements are disposed on a common second contact bridge.

According to the present invention, in each case one make contact element is provided in the coil circuit of each coil of each power contactor, the make contact elements being able to be actuated jointly. The main make contact elements of each power contactor are arranged between two auxiliary contact units which each have a make contact element and a break contact element which are designed as positively driven contacts, the make contact elements of all auxiliary contact units being connected in series in a first indicator circuit and the break contact elements of all auxiliary contact units being connected in series in a second indicator circuit. The contact elements of the power contactors and allocated auxiliary contact units are fixed on a common contact bridge.

BRIEF DESCRIPTION OF THE DRAWINGS

Further details and advantages of the present invention are described below based on exemplary embodiments with reference to the figures.

DETAILED DESCRIPTION

Figure 1:
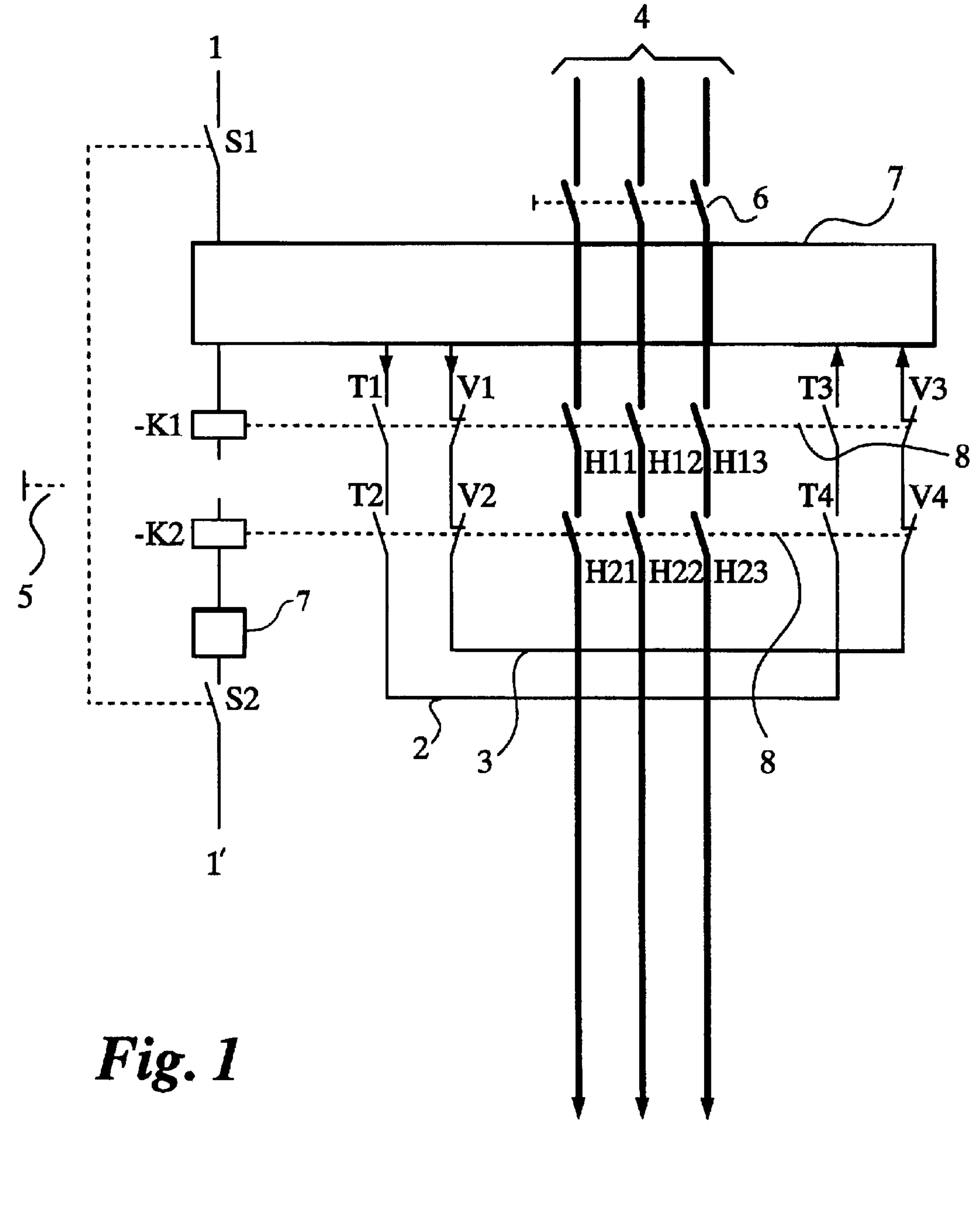
FIG. 1 shows a schematic view of a circuit arrangement according to an embodiment of the present invention.
Figure 2:
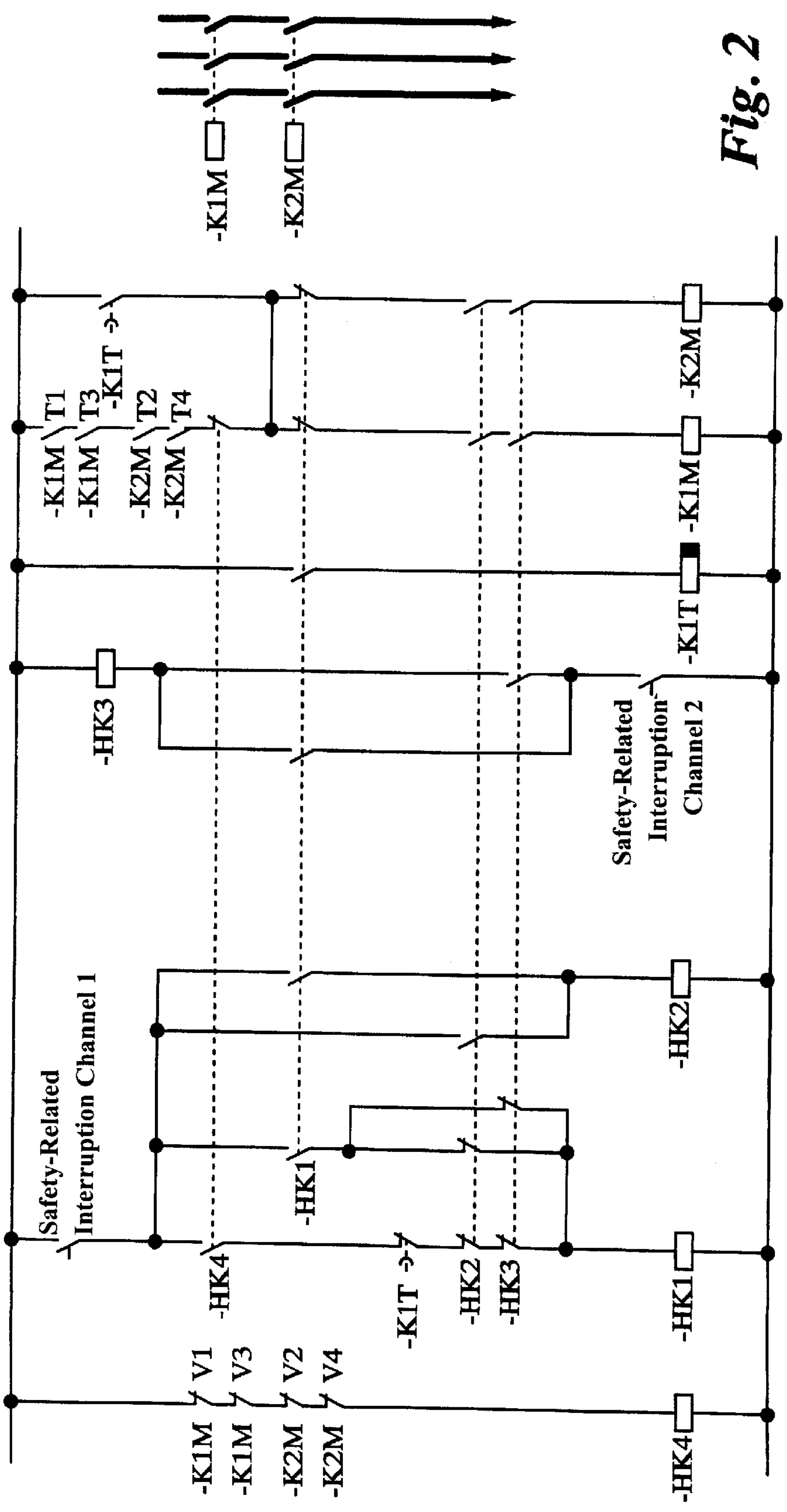
FIG. 2 shows a schematic view of an interconnection of self-monitoring power contactors in a redundant design.

The circuit arrangement according to FIG. 1 includes two power contactors whose coils are denoted by K1 and K2. Each of coils K1, K2 is arranged in a circuit 1 or 1', respectively, which can be closed by a make contact element S1 or S2 via interrogation circuit 7. Thus, make contact elements S1 and S2 do not directly act upon the power contactors but upon interrogation circuit 7 as a safety-related interruption for channels 1 and 2 (FIG. 2). Make contact elements S1 and S2 can be actuated by a manual momentary contact switch 5. The power contactors are arranged with their main make contact elements H11 , H12, H13 and H21, H22, H23 in the enable circuits (here jointly denoted by 4) between auxiliary contact units, each auxiliary contact unit containing a contact pair T1, V1; T3, V3; T2, V2; T4, V4 composed of a make contact element T1, T3, T2, T4 and a break contact element V1, V3, V2, V4. The contacts of each auxiliary contact unit are positively driven within themselves, that is the break contact element and the make contact element can never be both open or both closed during normal operation. Make contact elements T1, T3 and T2, T4, respectively, are connected in series and arranged in a first indicator circuit 2. This indicator circuit 2 provides information on the active position. Break contact elements V1, V3 and V2, V4, in turn, are connected in series and arranged in a second indicator circuit 3, respectively. This indicator circuit 3 provides information on the passive position. The information from indicator circuits 2 and 3 is monitored and evaluated by an interrogation circuit 7. Since the circuit arrangement provided with a protective function according to the present invention does not fulfill the requirement for disconnector properties, provision is made for a main switch 6 in enable circuits 4.

FIG. 1 depicts the circuit arrangement in the de-energized state in which coils K1, K2 are de-energized, a current flows in indicator circuit 3 and indicator circuit 2 is interrupted. If momentary contact switch 5 is now actuated, make contact elements S1 and S2 are closed. Coils K1 and K2 are excited; the contactors pick up. In the process, make contact elements T1, T3 and T2, T4, respectively, close while break contact elements V1, V3 and V2, V4 open, respectively. Main make contact elements H11, H12, H13, H21, H22, H23 of enable circuit 4 are closed. If momentary contact switch 5 is not actuated, the conditions of the de-energized state are, in the normal case, restored.

FIG. 2 depicts the redundant and self-monitoring interconnection of two power contactors. The components of the enable circuits are denoted by K1M, K2M, those of contactor relays, or auxiliary contacts, by HK1, HK2, HK3, HK4. A timer component K1T used for start-up bridging for the power contactors has also positively driven contacts. Due to the redundant design, the functional reliability of the circuit is guaranteed even if one of the self-monitoring power contactors fails completely.

Figure 3:
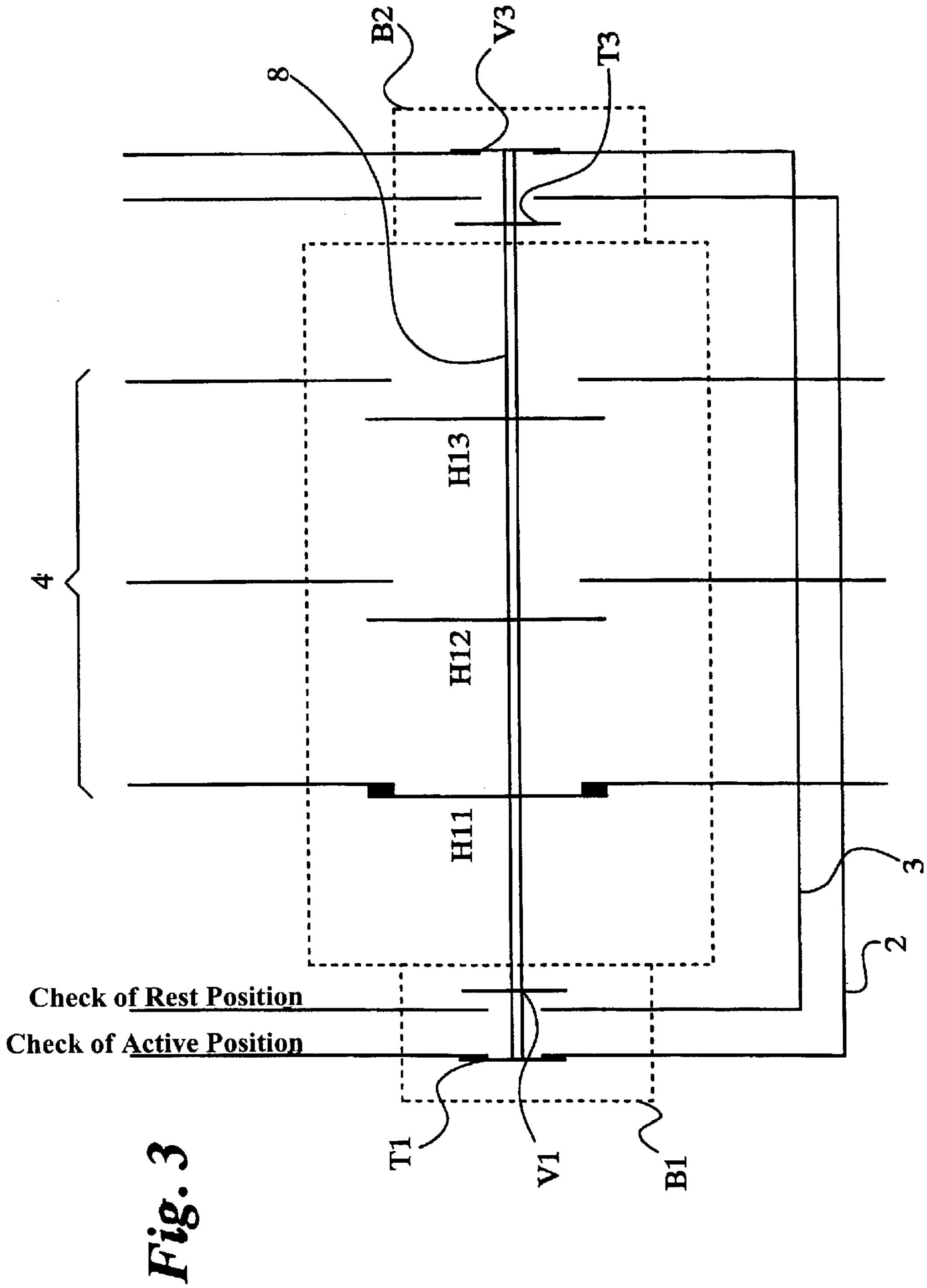
FIG. 3: shows a schematic representation of a power contactor arranged between auxiliary contact units for a circuit arrangement according to the present invention, depicting a first fault where the main contacts of the power contactors are welded.
Figure 4:
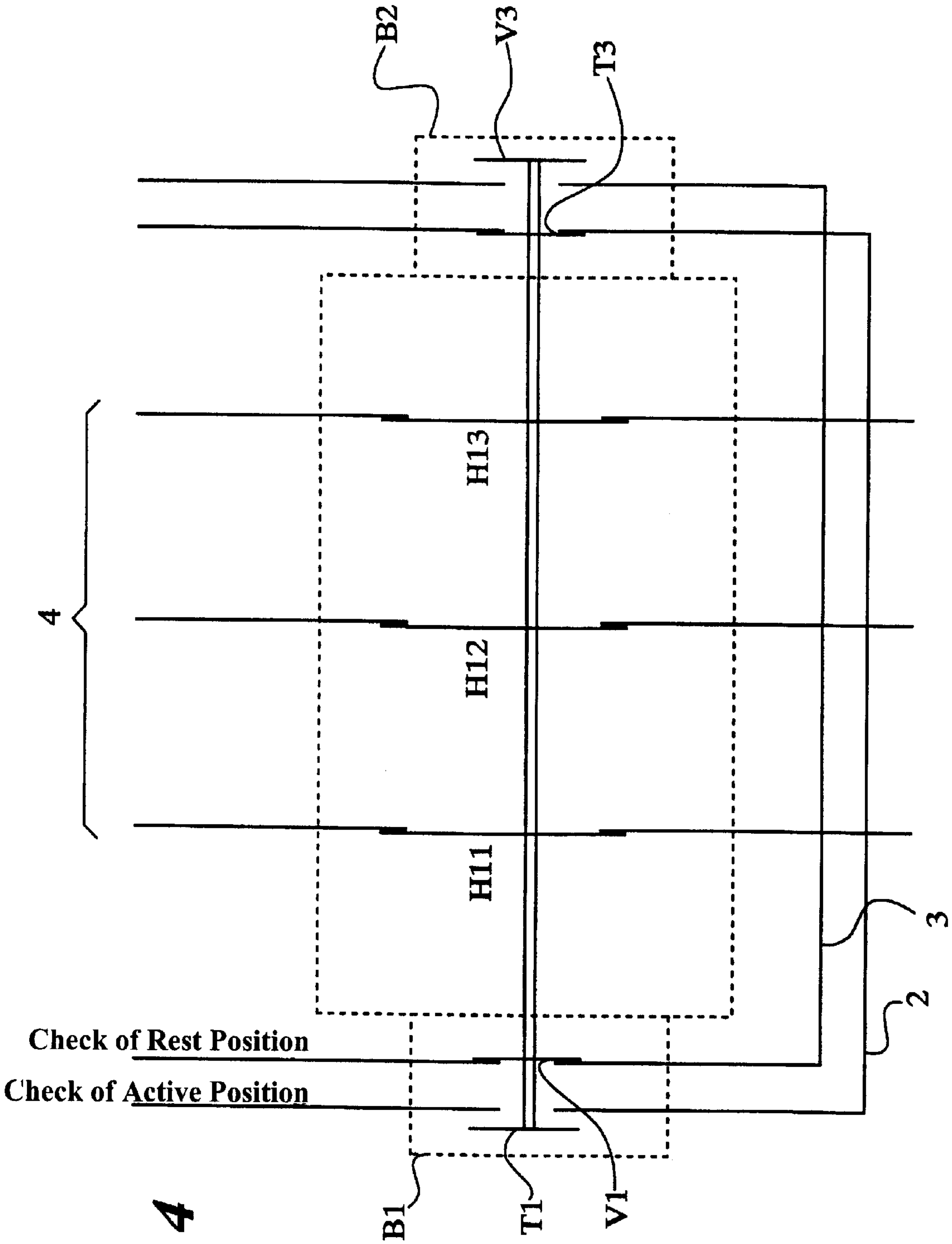
FIG. 4: shows a schematic representation of a power contactor arranged between auxiliary contact units for a circuit arrangement according to the present invention, depicting a second fault where a contact of an auxiliary contact unit is welded.

FIGS. 3 and 4 are schematic representations of fault conditions. In each case shown are make contact elements of a power contactor which are arranged between two auxiliary contact units B1 and B2.

FIG. 3 shows a fault condition in which one of main make contact elements H11 becomes welded. By the tilting of contact bridge 8, break contact element V3 can close again and would in principle signal a release. However, break contact element V1 which is arranged in the same indicator circuit 3 and situated in the spatial vicinity of main make contact element H11 remains open so that no current flows in indicator circuit 3, which is recognized by interrogation circuit 7 (FIG. 1). Accordingly, make contact element T3 opens but, since make contact element T1 remains closed, the fault is also recognized in indicator circuit 2. In the case of a welding of main make contact elements H12 and H13, the make and break contacts of the contactor relays behave correspondingly.

FIG. 4 illustrates the situation when one of the contacts of an auxiliary contact unit becomes welded, here, by way of example, break contact element V1. Due to the strong pickup force, contact V1 bends, however, without opening, and all further contacts except for T1 go into their active position. However, the check of the active position via indicator line 2 signals the fault because of open make contact element T1 and the power contactor goes into the OFF position after a short start-up bridging via timer component K1T (FIG. 2).

The circuit arrangement of the present invention fulfills the requirement according to which an individual fault must be recognized by carrying out the protective function. Moreover, the circuit arrangement fulfills the requirements for breaking devices to prevent unexpected starting. In the case of a suitable design of the interrogation circuit, the requirements for protection against unauthorized, unintentional and/or erroneous closing are fulfilled as well. However, the circuit arrangement has no disconnector properties, therefore the main switch 6 in the enable circuits is still necessary.

It will of course be understood that the present invention has been described above only by way of example and that modifications of details can be made within the scope of the invention.

What is claimed is:

1. A protective circuit arrangement comprising:

a first power contactor, the first power contactor including a first coil and a first main make contact element;

a second power contactor, the second power contactor including a second coil and a second main make contact element, the second main make contact element being connected in series with the first main make contact element in an enable circuit;

a first coil circuit make contact element connected in a first coil circuit of the first coil;

a second coil circuit make contact element connected in a second coil circuit of the second coil, the first and second coil circuit make contact elements being capable of being jointly actuated;

a first auxiliary contact unit including a first make contact element and a first break contact element, the first make and break contact elements being positively driven;

a second auxiliary contact unit including a second make contact element and a second break contact element, the second make and break contact elements being positively driven;

a third auxiliary contact unit including a third make contact element and a third break contact element, the third make and break contact elements being positively driven; and a fourth auxiliary contact unit including a fourth make contact element and a fourth break contact element, the fourth make and break contact elements being positively driven;

wherein:

the first, second, third and fourth make contact elements are connected in series in a first indicator circuit;

the first, second, third and fourth break contact elements are connected in series in a second indicator circuit;

the first main make contact element is disposed between the first and third auxiliary contact units;

the second main make contact element is disposed between the second and fourth auxiliary contact units;

the first main make contact element and the first and third make and break contact elements are disposed on a common first contact bridge; and the second main make contact element and the second and fourth make and break contact elements are disposed on a common second contact bridge.

* * * * *